United States Patent [19]
Golinelli et al.

[11] Patent Number: 4,553,332
[45] Date of Patent: Nov. 19, 1985

[54] PROBE FOR CHECKING LINEAR DIMENSIONS

[75] Inventors: Guido Golinelli, Bologna; Carlo Dall'Aglio, Volta Reno Di Argelato, both of Italy

[73] Assignee: Finike Italiana Marposs S.p.A., S. Marino di Bentivoglio, Italy

[21] Appl. No.: 543,011

[22] Filed: Oct. 18, 1983

[30] Foreign Application Priority Data

Oct. 18, 1982 [IT] Italy ................. 3563 A/82

[51] Int. Cl.⁴ ............................................. G01B 7/02
[52] U.S. Cl. .................................. 33/561; 33/169 R; 33/172 E
[58] Field of Search ............. 33/169 R, 172 E, 174 L, 33/174 P, 23 K

[56] References Cited

U.S. PATENT DOCUMENTS

| | | |
|---|---|---|
| 3,149,421 | 9/1964 | O'Brien . |
| 3,945,124 | 3/1976 | Jacoby ................. 33/169 R |
| 4,078,314 | 3/1978 | McMurtry ............ 33/174 L |
| 4,130,941 | 12/1978 | Amsbury ............. 33/174 L |
| 4,341,019 | 7/1982 | Possati . |
| 4,441,257 | 4/1984 | Golinelli ............ 33/174 L |
| 4,447,958 | 5/1984 | Tanaka ............... 33/174 L |

FOREIGN PATENT DOCUMENTS

| | | |
|---|---|---|
| 2440692 | 4/1975 | Fed. Rep. of Germany . |
| 0150161 | 11/1979 | Japan .................. 33/169 R |
| 1289000 | 9/1972 | United Kingdom . |
| 2004656 | 4/1979 | United Kingdom . |

Primary Examiner—Harry N. Haroian
Attorney, Agent, or Firm—Stevens, Davis, Miller & Mosher

[57] ABSTRACT

A probe for checking linear dimensions of mechanical parts comprises a support, a movable arm carrying a feeler adapted for contacting the part to be checked and an integral member coupled to the movable arm and the support. The member includes a first portion fixed to the movable arm a second portion fixed to the support and an intermediate portion having two sections with reduced thickness which define two axes of mutual rotation of the first and second portion. An electrical circuit closed under rest conditions comprises two pairs of electrical contacts which are opened in consequence of displacements of the movable arm along opposite directions or of an axial displacement of the arm.

13 Claims, 9 Drawing Figures

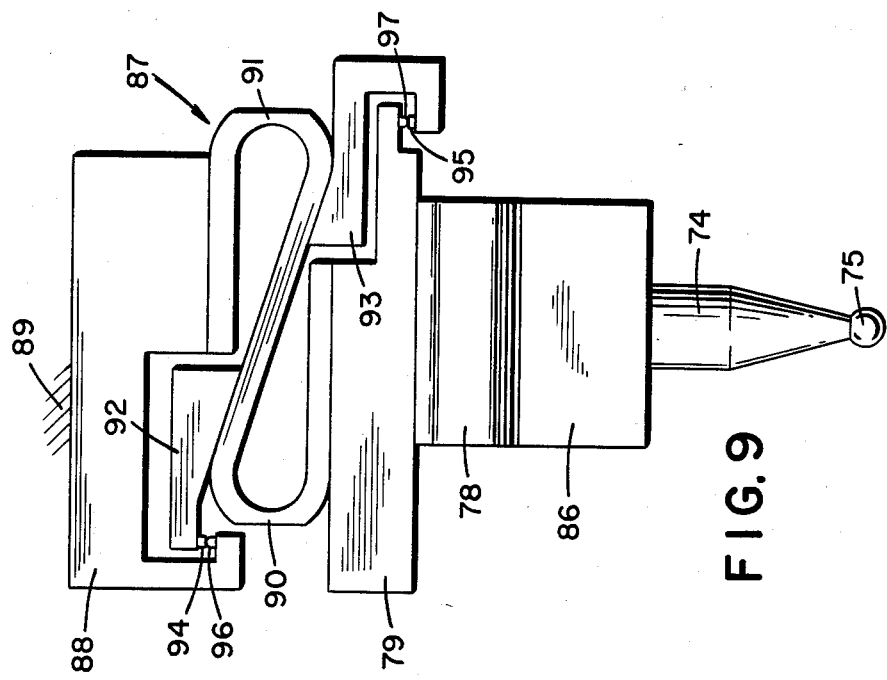
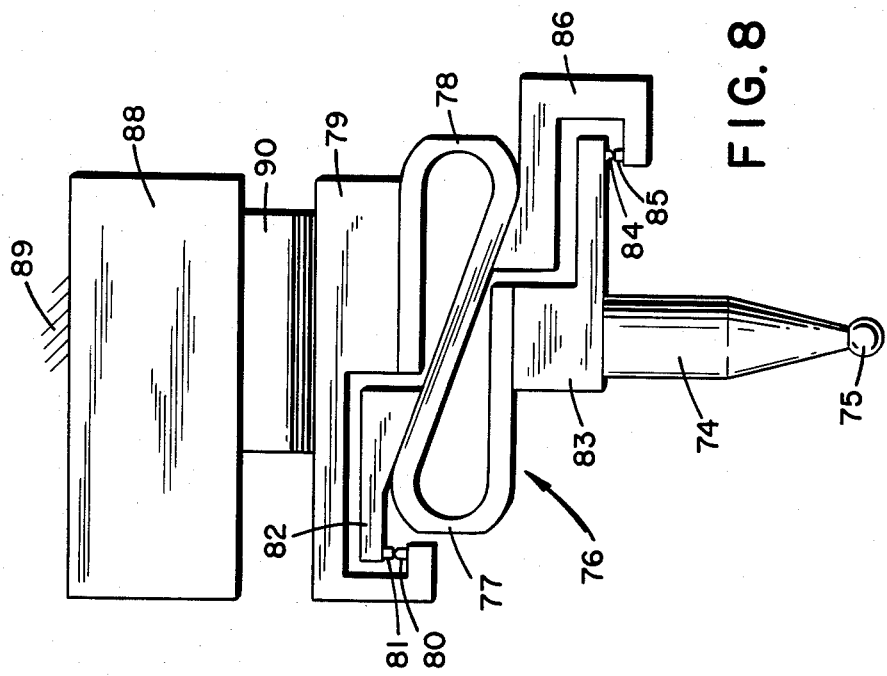

PROBE FOR CHECKING LINEAR DIMENSIONS

BACKGROUND OF THE INVENTION

1. Field of the Invention

The present invention relates to a probe for checking linear dimensions, like dimensions of mechanical pieces, with support means, an arm movable with respect to the support means and carrying at an end feeler means adapted for touching a piece to be checked, the movable arm defining a longitudinal geometrical axis, connection means for connecting the arm to the support means for allowing the displacement of the feeler means with respect to the support means along two opposite directions, and detection means associated with the arm and the connection means.

2. Description of the Prior Art

As already known, at present there is a developing trend to equip the turning machines and the machining centers with heads or probes for checking linear dimensions of pieces machined, or to be machined, and of the tools.

These heads usually include an arm carrying a feeler element adapted to contact the piece or the tool, a support, devices for connecting the arm to the support-that allow the feeler to displace along one or more axes-and detection means.

The detection means can include position transducers for providing measurement signals (usually of a comparative type), or electrical contacts that open as a consequence of the mechanical contact occurring between the feeler and the surface of the piece (or tool); in the second case, the opening of the electrical contacts provides a logic signal that controls the reading of the measurement signals provided by transducers associated with the slide(s) of the machine tool on which there are installed the head and/or the piece, and/or the tool.

It is obvious that the essential requirements of heads specifically made for similar applications are sturdiness, reproducibility i.e. repeatability of the measurements and small layout dimensions.

In the known heads or probes, among these contrasting requirements there is obtained a not fully satisfying compromise. More specifically, most of the known heads have a moderately acccurate repeatability, due to the fact that the devices coupling the movable arm to the support are based upon systems that involve frictions and clearances.

SUMMARY OF THE INVENTION

The object that the present invention aims to solve is to provide a probe that, as compared with those already known, guarantees a better compromise among the aforementioned contrasting requirements.

The foregoing and other objects and advantages of the present invention, that will become more apparent from the following detailed description, are reached by a probe of the formerly mentioned type, wherein, according to the invention, the connection means include an integral member with a first portion fixed to the movable arm, a second portion fixed to the support means and an intermediate portion with two sections of smaller thickness adapted for defining two parallel and distinct axes of mutual rotation of the first and second portion, the detection means including a first pair of elements with a first element coupled to the first portion and a second element coupled to the intermediate portion and a second pair of elements with a third element coupled to the second portion and a fourth element coupled to the intermediate portion.

BRIEF DESCRIPTION OF THE DRAWINGS

Purely illustrative and non-limiting preferred embodiments of the invention are now described in detail with reference to the accompanying drawings, in which:

FIGS. 8 and 9 are two longitudinal views, at right angles to each other, of a variant of the probe shown in FIG. 6.

DETAILED DESCRIPTION

Figure 1:
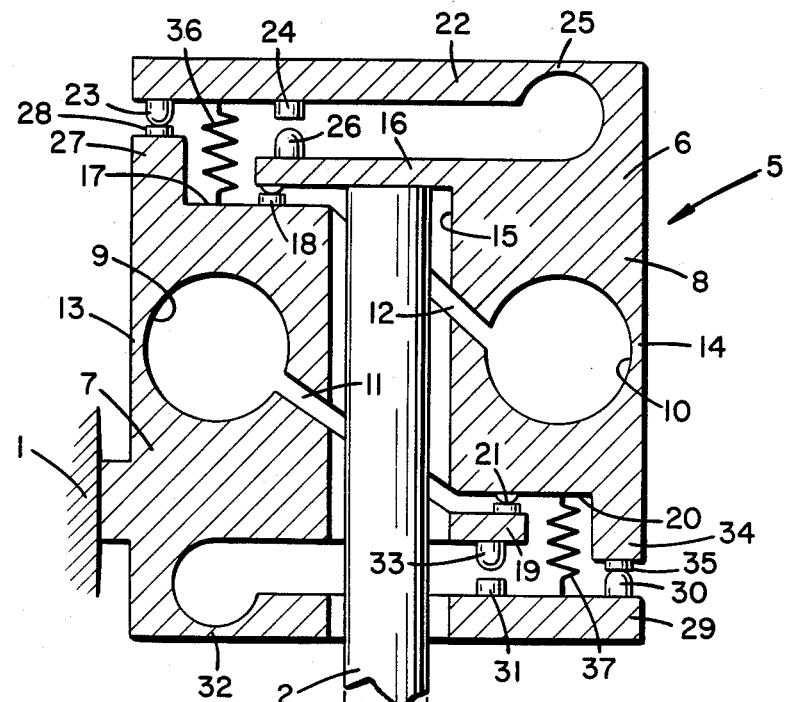
FIG. 1 is a longitudinal sectional view of a touch probe head.
Figure 2:
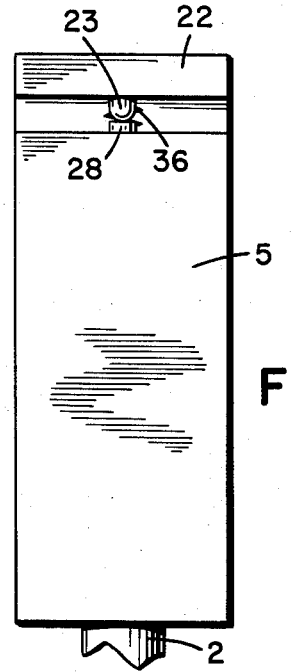
FIG. 2 is a lateral view from left to right of the head of FIG. 1.
Figure 3:
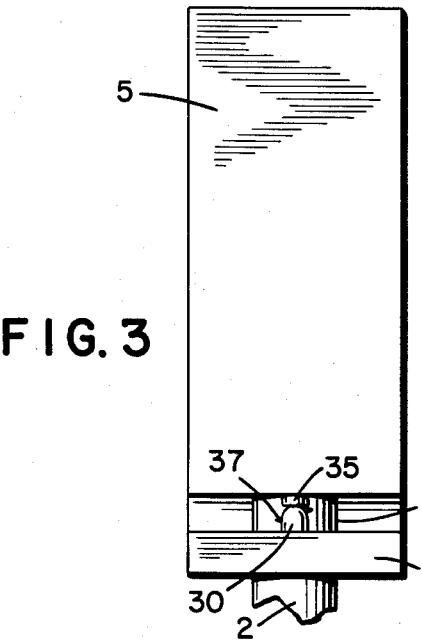
FIG. 3 is a lateral view from right to left of the head shown in FIG. 1.

The touch probe head shown in FIGS. 1 to 3 includes support means including an outer housing of a substantially cylindrical shape, that in FIG. 1 is schematically shown and indicated by reference number 1. A movable arm 2, defining a longitudinal geometrical axis coincident-under rest conditions-with the longitudinal geometrical axis of the head, carries at an end feeler means, i.e. a feeler 3 that can contact the surface of a piece 4, as a result of piece or head displacements controlled by the logic circuits of the machine tool whereupon the head is installed.

Arm 2 is carried by housing 1 by connection or coupling means basically consisting of an integral member or block 5. Member 5 includes a first portion 6 whereto there is clamped, in a way that is not illustrated, arm 2; a second portion 7 that is secured, in a way that is not illustrated, to support housing 1; and an intermediate portion 8.

In intermediate portion 8 there are formed two cylindrical through holes 9 and 10.

In intermediate portion 8 there are also formed two cuts 11 and 12 that end in holes 9 and 10 and have two parallel sections in an oblique direction and two sections in a horizontal direction.

In this way there are formed two thin, resiliently deformable, i.e. flexible, sections 13 and 14, that allow rotatory displacements of arm 2 about two parallel and distinct geometrical axes that lie in a plane that is perpendicular to the longitudinal geometrical axis of the head and to the plane of FIG. 1. The upper section of arm 2 houses, with sufficient clearance for allowing displacements of the required amplitude, in a hole 15 formed in block 5. As in practice the displacements are of a limited amplitude, feeler 3 substantially moves along two opposite directions of a straight line lying in the plane of FIG. 1.

Portion 6 has a horizontal wing 16 facing a horizontal flat surface 17 defined by intermediate portion 8. Two positive stops, indicated by a single reference number 18, are fixed to wing 16 and surface 17.

In the same manner portion 7 has a horizontal wing 19 facing a horizontal flat surface 20 defined by intermediate portion 8. Two positive stops, marked by a single reference number 21 for simplicity's sake, are fixed to wing 19 and surface 20. Under rest conditions the two positive stops 18 and the two positive stops 21 steadily abut against each other, respectively.

Positive stops, or reference abutments, 18 and 21 serve to define the axis whereabout arm 2 rotates when feeler 3 displaces along the directions marked by arrows $+X$ and $-X$. In fact, if feeler 3 moves in the direction indicated by arrow $-X$, the two positive stops 21 are urged one against the other and consequently surface 20 and wing 19 are not subject, substantially, to any mutual motion, while arm 2 and the first portion 6 rotate about the axis defined by section 14.

On the contrary, if feeler 3 displaces in the $+X$ direction, second portion 7 remains stationary. Wing 16 and surface 17 are not subject, substantially, to any mutual motion, but they rotate with arm 2 about the axis defined by section 13.

Under rest conditions the geometrical axis of arm 2 is equally distant from the axes of rotation defined by sections 13 and 14.

A bar 22 has a first section, to which there are coupled a first electrical contact 23 and a first positive stop 24, and a second section integrally connected with the first portion 6. A section 25 of bar 22 has a reduced thickness sufficiently small so that section 25 can resiliently deform to define an axis of rotation of bar 22 that is perpendicular to the plane of FIG. 1, and consequently parallel to the axes of rotation defined by sections 13 and 14.

A second positive stop 26 is coupled to wing 16 in such a way that, under rest conditions, it does not abut against positive stop 24.

Intermediate portion 8 has a vertical wing 27 at the upper end of which there is coupled a second electrical contact 28 that, under rest conditions contacts the first contact 23.

A second bar 29 has a first section, whereto there are coupled a third electrical contact 30 and a third positive stop 31, and a second section integrally connected with the section portion 7. A section 32 of bar 29 has a reduced thickness, sufficiently small so that section 32 can resiliently deform to define an axis of rotation of bar 29 that is perpendicular to the plane of FIG. 1, and consequently parallel to the axes of rotation defined by sections 13 and 14.

A fourth positive stop 33 is coupled to wing 19 in such a way that, under rest conditions, it does not abut against positive stop 31. Intermediate portion 8 has a vertical wing 34 at the lower end of which there is coupled a fourth electrical contact 35 that, under rest conditions, contacts the third contact 30.

The closure of contacts 23, 28 and 30, 35 and the abutment of positive stops 18 and 21 are ensured, under rest conditions, by two return springs 36, 37 that have ends coupled to bar 22 and near wing 27 and, respectively, to bar 29 and near wing 34.

When feeler 3 moves in the $-X$ direction, initially, owing to spring 36, contacts 23 and 28 remain closed and the first section of bar 22 rotates about the axis of rotation defined by section 25. Subsequently positive stop 26 abuts against positive stop 24 and consequently the mutual rotation of bar 22 and portion 6 ceases and contacts 23 and 28 open to provide a logic signal that indicates that the displacement of feeler 3 in a $-X$ direction has occurred (this displacement occurs, for example, when the head, by moving from the left side to the right side of FIG. 1, contacts a piece located at the other side of feeler 3 with respect to the side where piece 4 has been shown).

In the same way, when feeler 3 is displaced, as a consequence of its contacting piece 4, in the $+X$ direction, initially owing to the action of spring 37, contacts 30 and 35 remain closed and the first section of bar 29 rotates about the axis of rotation defined by section 32. Subsequently positive stop 31 contacts positive stop 33 and consequently the mutual rotation of bar 29 with respect to portion 7 ceases and contacts 30 and 35 move apart, so providing a logic signal that indicates there has occurred the displacement of feeler 3 in the $+X$ direction.

From the above, it is understood that the distances, under rest conditions, between the pairs of positive stops 24, 26 and 31, 33 define the prestrokes of the head, i.e. the entity of the displacements that feeler 3 has to travel before its contacting the pieces to be checked is electrically detected.

The structure of the head shown in FIG. 1 enables feeler 3 to move even in the direction indicated by $+Y$ arrow. In this case the combination of the rotation movements about the axes defined by sections 13 and 14 causes a translation of the first portion 6 along the $+Y$ direction.

Figure 4:
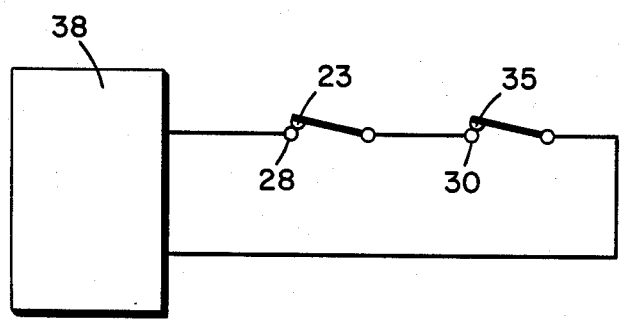
FIG. 4 illustrates an electrical circuit adapted for indicating the contacting of the feeler of the head shown in the previous figures with the piece.

Contacts 23, 28 and 30, 35 are arranged in an electrical series circuit connected to a logic unit 38, as shown in FIG. 4. The mutual distances of positive stops 24, 26 and 31, 33 may be different in order that, as a consequence of a displacement in the $+Y$ direction, there always opens first one of the two pairs of contacts, for example pair 30, 35.

Figure 5:
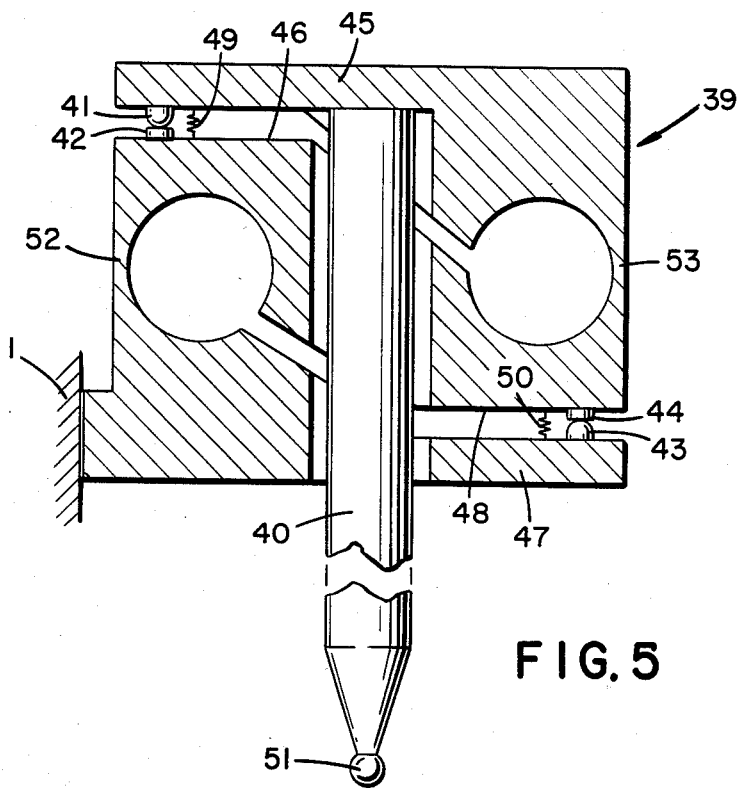
FIG. 5 schematically shows the essential elements of a touch probe, according to a first variant.

In the event no prestrokes are required, the structure of the head can be simplified and its dimensions can be smaller, as shown in FIG. 5, that is now only briefly described, as it is in many ways similar to FIG. 1.

Integral member 39, at a portion of which there is connected arm 40, deforms in a similar way as that described for member 5. However in this case elements 41, 42 and 43, 44-which are respectively fixed to a wing 45, to a horizontal flat surface 46, to a wing 47 and a horizontal flat surface 48-act as two pairs of positive stops (at least in part similar to positive stops 24, 26 and 31, 33 of FIG. 1), as reference abutments (with similar functions to that accomplished by reference abutments 18 and 21 of FIG. 1) and as two pairs of electrical contacts (with functions similar to that accomplished by contacts 23, 28 and 30, 35 of FIG. 1) closed under rest conditions by springs 49, and 50. These contacts open as soon as the displacement of a feeler 51, coupled to the free end of arm 40, causes the resilient deformation of two thin sections 52, 53 of member 39.

Figure 6:
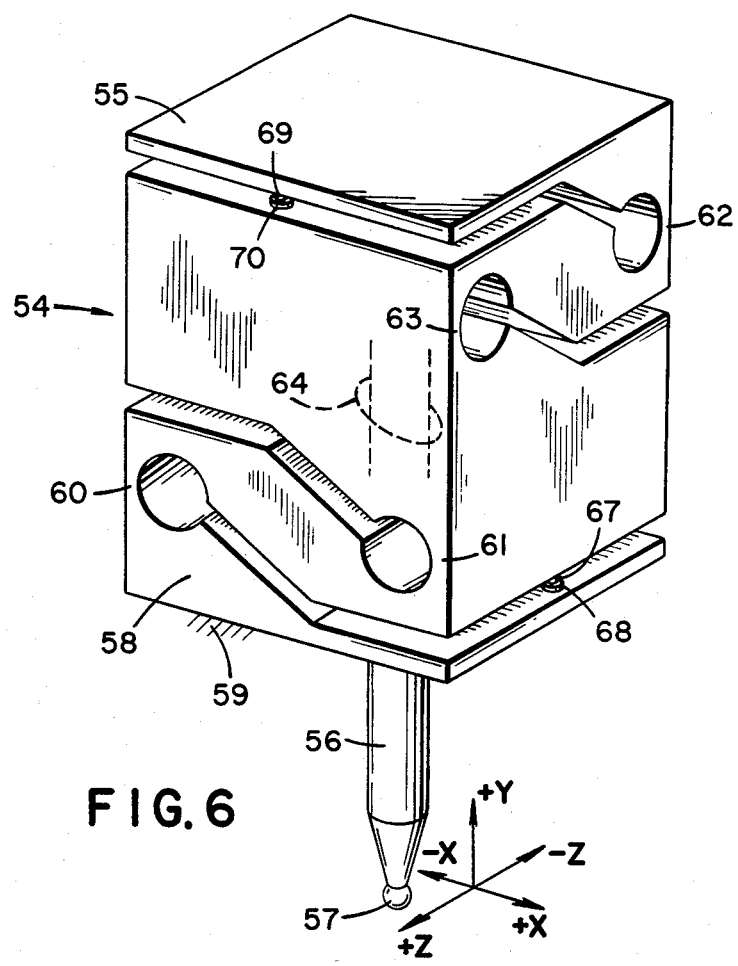
FIG. 6 schematically shows another touch probe with a feeler movable along an increased number of directions with reference to the probe shown in the previous figures.
Figure 7:
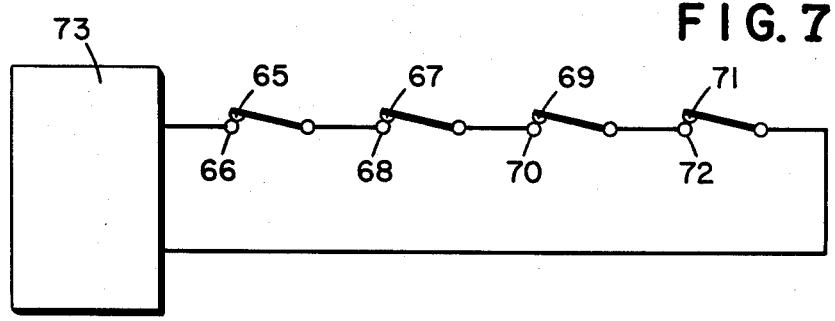
FIG. 7 shows an electrical circuit adapted for detecting the contacting of the feeler of the probe shown in FIG. 6 with the piece.

The head schematically shown in FIG. 6, that will be only briefly described as its structure and operation can easily be understood in view of the former description, includes a single integral member 54 that substantially accomplishes the functions of two integral members corresponding to that, 39, of FIG. 5, integrally connected with each other but displaced 90° therefrom.

Member 54 has a portion or wing 55, where there is clamped an end of a movable arm 56 that carries at its other end a feeler 57.

Another portion 58 of member 54 is fixed to a support 59.

Member 54 defines 4 axes of rotation of arm 56 by means of relevant sections 60, 61, 62, 63, that have smaller thickness so as to be resiliently deformable.

The axes of rotation defined by sections 60 and 61 are parallel with respect to each other, lie in a plane perpendicular to the geometrical axis defined by arm 56 under rest conditions, and are equally distant from the geometrical axis. The axes of rotation defined by sections 62, and 63 are parallel with respect to each other, have a perpendicular direction with respect to that of the axes defined by sections 60 and 61, lie in another plane perpendicular to the geometrical axis defined by arm 56 under rest conditions and are equally distant from said geometrical axis. Arm 56 passes through a hole in member 54. This hole-indicated with dashed line 64-has a sufficiently big diameter so as to enable transversal displacements of the arm along +/−X and +/−Z directions.

Four pairs of electrical contacts 65, 66; 67, 68; 69, 70; 71, 72 are connected in series in a detection circuit including a logic unit 73. Electrical contacts 65–72 obviously also act as positive stops. The head also includes the necessary components corresponding to those illustrated in FIGS. 1 and 5.

The displacements of feeler 57 in directions +X, −X, +Z, −Z are enabled by rotations about the axes respectively defined by sections 60, 61, 62 and 63. Feeler 57 can also displace in the +Y longitudinal direction, thanks to the resilient deformation of all sections 60–63.

A similar head to that shown in FIG. 6 can be made according to the variant shown in FIGS. 8 and 9. A movable arm 74 carrying a feeler 75 is fixed to a side of an integral member 76, with a substantially S-shaped contour, that defines two parallel axes of rotation by means of two thin sections 77, and 78, resiliently deformable. Another side of member 76 is fixed to an element 79 that carries an electrical contact 80 which is closed, under rest conditions, against a second electrical contact 81 fixed to an element 82 secured to the intermediate side of member 76. An element 83 secured to movable arm 74 carries a third electrical contact 84 which, under rest conditions, is closed against a fourth electrical contact 85 fixed to an element 86 secured to the intermediate side of member 76. The electrical contacts 80, 81, 84 and 85 also accomplish the functions of positive stops or reference abutments.

To element 79 there is fixed a side of a second integral member 87, another side of which is fixed to an element 88 in turn fixed to a support 89.

Member 87 is identical to member 76 and consequently defines two axes of rotation by means of two thin sections 90 and 91, but it is rotated 90° with respect to it. The two members 76 and 87 can be made acccording to the disclosure of U.S. Pat. No. 4,341,019.

To the intermediate side of member 87 there are fixed two elements 92 and 93 that respectively carry a fifth electrical contact 94 and a sixth electrical contact 95. A seventh electrical contact 96 is fixed to a wing of element 88 and an eighth electrical contact 97 is fixed to a wing of element 79.

The operation of the head shown in FIGS. 8 and 9 is substantially the same as that of the head of FIG. 6 and consequently it is not described.

Obviously the head shown in FIG. 6 and, in the same way, that of FIGS. 8 and 9 are able to detect the contacting with the piece in all the directions of plane XZ.

According to the previous description, it is obvious that the displacements of the movable arms of the heads according to the invention are obtained by using resiliently deformable elements, not involving friction. This enables achieving an excellent repeatability.

The previously described heads are all of the touch probe type. However it is obvious that in the place of electrical contacts there can be used equivalent position transducer elements, so enabling the manufacture of gauging heads.

It also is obvious that other modifications and variants, equivalent from a functional or structural point of view, can be made to the aforedescribed embodiments, without departing from the scope of the invention.

What is claimed is:

1. A probe for checking linear dimensions, like dimensions of mechanical pieces, comprising support means, an arm movable with respect to the support means and carrying at an end feeler means adapted for touching a piece to be checked, the movable arm defining a longitudinal geometrical axis, connection means for connecting the arm to the support means for allowing the displacement of the feeler means with respect to the support means along two opposite directions, and detection means associated with the arm and the connection means for detecting said displacement, wherein said connection means include an integral member with a first portion fixed to the movable arm, a second portion fixed to the support means and an intermediate portion with two sections of smaller thickness adapted for defining two parallel and distinct axes of mutual rotation of the first and second portion, the detection means including a first pair of elements with a first element coupled to the first portion and a second element coupled to the intermediate portion and a second pair of elements with a third element coupled to the second portion and a fourth element coupled to the intermediate portion.

2. The probe according to claim 1, wherein said opposite directions of displacement are substantially perpendicular with respect to said geometrical axis and said axes of rotation lie in a plane substantially perpendicular to the geometrical axis.

3. The probe according to claim 2, wherein said movable arm lies, in a rest condition, at equal distances from said two parallel and distinct axes of mutual rotation, for allowing displacements of the movable arm along said longitudinal geometrical axis.

4. The probe according to claim 2, wherein said detection means include switch means with electrical contacts that are closed in a rest condition, each of said elements defining a relevant electrical contact.

5. A probe for checking linear dimensions, like dimensions of mechanical pieces, comprising support means, an arm movable with respect to the support means and carrying at an end feeler means adapted for touching a piece to be checked, the movable arm defining a longitudinal geometrical axis, connection means for connecting the arm to the support means for allowing the displacement of the feeler means with respect to the support means along two opposite directions substantially perpendicular with respect to said geometrical axis, detection means associated with the arm and the connection means for detecting said displacement, the detection means including switch means with electrical contacts that are closed in a rest condition, wherein said connection means include an integral member with a first portion fixed to the movable arm, a second portion fixed to the support means and an intermediate portion with two sections of smaller thickness adapted for defining two parallel and distinct axes of mutual rotation of the first and second portion, these parallel and distinct axes lying in a plane substantially perpendicular to the geometrical axis, the switch means including a first pair of elements with a first element coupled to the first portion and a second element coupled to the intermediate portion and a second pair of elements with a third element coupled to the second portion and a fourth element coupled to the intermediate portion, each of said elements defining a relevant electrical contact, first and second positive stop means, the first positive stop means including a first positive stop resiliently connected to the first portion and a second positive stop rigidly coupled to the first portion, the second positive stop means including a third positive stop resiliently connected to the second portion and a fourth positive stop rigidly coupled to the second portion, and resilient means arranged to keep closed the two pairs of electrical contacts; the first and the second positive stop and, respectively, the third and fourth positive stop being adapted for contacting each other as a consequence of the displacements of the movable arm from a rest position for determining the opening of one or the other pair of electrical contacts.

6. The probe according to claim 5, wherein said first electrical contact has a fixed position with respect to the first positive stop and the third electrical contact has a fixed position with respect to the third positive stop.

7. The probe according to claim 6, wherein said first positive stop means include a first bar with a first section whereto there are fixed the first electrical contact and the first positive stop and a second section connected to said first portion of the connection means, the second section including a section of smaller thickness adapted for defining a first axis of mutual rotation of the first section of the bar with respect to said first portion, said axis of mutual rotation being parallel to said two parallel and distinct axes; the second positive stop means including a second bar with a first section to which there are fixed the third electrical contact and the third positive stop and a second section connected to said third portion of the connection means, this second section including a section of smaller thickness adapted for defining an axis of mutual rotation of the first section of the second bar with respect to said third portion, this axis of mutual rotation being parallel to said two parallel and distinct axes.

8. The probe according to claim 7, further comprising abutment means adapted for defining the rest position of said member and of said first and second bar.

9. The probe according to claim 6, wherein said movable arm is located, under rest conditions, at identical distances from said two parallel and distinct axes of mutual rotation, in order to enable displacements of the movable arm along said longitudinal geometrical axis, and wherein said switching means include an electrical circuit in which the pairs of contacts defined by said pairs of elements are connected in series, said first and second positive stops, and respectively, said third and fourth positive stops being located, under rest conditions, at different mutual distances, the two positive stops at a minor distance being adapted for causing a first opening of said electrical circuit.

10. A probe for checking linear dimensions, like dimensions of mechanical pieces, comprising support means, an arm movable with respect to the support means and carrying at an end feeler means adapted for touching a piece to be checked, the movable arm defining a longitudinal geometrical axis, connection means for connecting the arm to the support means for allowing the displacement of the feeler means with respect to the support means along two opposite directions, and detection means associated with the arm and the connection means for detecting said displacement, wherein said connection means include an integral member with a first portion fixed to the movable arm, a second portion fixed to the support means and an intermediate portion with two sections of smaller thickness adapted for defining two parallel and distinct axes of mutual rotation of the first and second portion, the detection means including a first pair of elements with a first element coupled to the first portion and a second element coupled to the intermediate portion and a second pair of elements with a third element coupled to the second portion and a fourth element coupled to the intermediate portion, and wherein said connection means include two additional sections of smaller thickness adapted for defining two further parallel and distinct axes of rotation, for permitting the displacement of the feeler means according to two further opposite directions, perpendicular to said opposite directions, the detection means including further pairs of elements for detecting said displacement according to the further opposite directions.

11. The probe according to claim 10, wherein said connection means include a second integral member that defines said further axes of rotation, the second member being substantially similar to the first member and connected to the first member but with an orientation different by 90°.

12. The probe according to claim 10, wherein said member includes the two additional sections of smaller thickness, the axes of rotation defined by the additional sections lying in a perpendicular direction with respect to the direction of the axes of rotation defined by the first sections of smaller thickness.

13. A probe for checking linear dimensions, like dimensions of mechanical pieces, comprising support means, an arm movable with respect to the support means and carrying at an end feeler means adapted for touching a piece to be checked, the movable arm defining a longitudinal geometrical axis, connection means for connecting the arm to the support means for allowing the displacement of the feeler means with respect to the support means along two opposite directions, and detection means associated with the arm and the connection means for detecting said displacement, wherein said connection means include an integral member with a first portion fixed to the movable arm, a second portion fixed to the support means and an intermediate portion with two sections of smaller thickness adapted for defining two parallel and distinct axes of mutual rotation of the first and second portion, the detection means including a first pair of elements with a first element coupled to the first portion and a second element coupled to the intermediate portion and a second pair of elements with a third element coupled to the second portion and a fourth element coupled to the intermediate portion, whereby displacements of the feeler means along one of said opposite directions occur through mutual rotation of the first and second portion about one of said parallel and distinct axes, displacements along the other of said opposite directions occur through mutual rotation of the first and second portion about the other of said parallel and distinct axes, and simultaneous mutual rotations of the first and second portion about said parallel and distinct axes permit displacements of the feeler means along one additional direction perpendicular to said opposite directions.

* * * * *